(12) United States Patent
Hodgson et al.

(10) Patent No.: US 12,449,095 B2
(45) Date of Patent: Oct. 21, 2025

(54) APPARATUS AND METHOD FOR FUELLING

(71) Applicant: NANOSUN IP LIMITED, Lancaster (GB)

(72) Inventors: Paul Joseph Hodgson, Cambridge (GB); Graham Hodgson, Lancaster (GB); Paul Anthony Cook, Poulton-le-Fylde (GB); Daniel Edward John Stanley, Lancaster (GB)

(73) Assignee: NANOSUN IP LIMITED, Lancaster (GB)

( * ) Notice: Subject to any disclaimer, the term of this patent is extended or adjusted under 35 U.S.C. 154(b) by 0 days.

(21) Appl. No.: 18/557,773

(22) PCT Filed: Apr. 27, 2022

(86) PCT No.: PCT/GB2022/051068
§ 371 (c)(1),
(2) Date: Oct. 27, 2023

(87) PCT Pub. No.: WO2022/229634
PCT Pub. Date: Nov. 3, 2022

(65) Prior Publication Data
US 2024/0240756 A1    Jul. 18, 2024

(30) Foreign Application Priority Data
Apr. 27, 2021    (GB) .................................... 2105998

(51) Int. Cl.
*F17C 5/00*    (2006.01)

(52) U.S. Cl.
CPC ...... *F17C 5/007* (2013.01); *F17C 2205/0335* (2013.01); *F17C 2205/035* (2013.01);
(Continued)

(58) Field of Classification Search
CPC .............. F17C 5/007; F17C 2205/0335; F17C 2205/035; F17C 2221/012; F17C 2250/03; F17C 2250/043
(Continued)

(56) References Cited

U.S. PATENT DOCUMENTS

| 2004/0163731 A1* | 8/2004 | Eichelberger ............. F17C 1/00 141/284 |
| 2009/0236006 A1* | 9/2009 | Farese ................... F17C 13/026 141/3 |

(Continued)

FOREIGN PATENT DOCUMENTS

| EP | 1760388 A2 | 3/2007 |
| EP | 3249282 A1 | 11/2017 |

(Continued)

OTHER PUBLICATIONS

UKIPO Search Report Under Section 17 Application No. GB2105998: pp. 1-6; Date of Search Oct. 11, 2021.
(Continued)

*Primary Examiner* — Craig M Schneider
*Assistant Examiner* — Christopher M Afful
(74) *Attorney, Agent, or Firm* — Taft Stettinius & Hollister LLP; Stephen F. Rost

(57) ABSTRACT

An apparatus and a method for fueling. The apparatus 10 comprising a plurality of vessels 1, 2, 3, 4, 5 for containing a fuel gas, each vessel of the plurality of vessels being selectively fluidly connectable to at least one receiving vessel 6 and a control means configured to selectively divide the plurality of vessels 1, 2, 3, 4, 5 into a plurality of banks each comprising one or more of the plurality of vessels 1, 2, 3, 4, 5. The control means is further configured to sequentially fluidly connect the plurality of banks to the at least one receiving vessel 6 such that when one of the plurality of
(Continued)

banks is fluidly connected to the at least one receiving vessel 6 the one or more of the plurality of vessels 1, 2, 3, 4, 5 within that bank are fluidly connected to the at least one receiving vessel 6 but are fluidly isolated from the one or more of the plurality of vessels 1, 2, 3, 4, 5 of the remaining ones of the plurality of banks.

16 Claims, 5 Drawing Sheets

(52) U.S. Cl.
CPC .... *F17C 2221/012* (2013.01); *F17C 2250/03* (2013.01); *F17C 2250/043* (2013.01)

(58) Field of Classification Search
USPC .......................................... 141/69
See application file for complete search history.

(56) References Cited

U.S. PATENT DOCUMENTS

| | | |
|---|---|---|
| 2010/0037982 A1 | 2/2010 | Bangs et al. |
| 2013/0248000 A1* | 9/2013 | Killeen ............... F17C 5/06 251/304 |
| 2014/0261863 A1* | 9/2014 | Cohen .................. F17C 5/06 141/4 |
| 2016/0116113 A1* | 4/2016 | Mrowzinski ........ F17C 5/007 222/3 |
| 2021/0062973 A1 | 3/2021 | Fukunaga et al. |

FOREIGN PATENT DOCUMENTS

| | | |
|---|---|---|
| EP | 3249282 B1 | 11/2020 |
| EP | 3767154 A1 | 1/2021 |
| EP | 4111088 A1 | 1/2023 |
| WO | 2022002330 A1 | 1/2022 |

OTHER PUBLICATIONS

United Kingdom Intellectual Property Office, Examination Report under Section 18(2) for Application No. GB2105998.5; Dated Oct. 19, 2023, pp. 1-3.

European Patent Office (EPO), Munich, Germany; Examination Report; Corresponding Application No: 22721833.6; Mailing Date: May 21, 2025; Ion; pp. 1-5.

* cited by examiner

APPARATUS AND METHOD FOR FUELLING

This application is a U.S. national stage application under 35 U.S.C. § 371 of PCT International Application Serial No. PCT/GB2022/05168 which has an international filing date of Apr. 27, 2022, designates the United States of America, and claims the benefit of GB Application No. 2105998.5, which was filed on Apr. 27, 2021. The disclosures of each of these prior applications are hereby expressly incorporated by reference in their entirety.

This invention relates to an apparatus for fueling, methods of use of the apparatus and a method for fueling a receiving vessel.

BACKGROUND

When hydrogen powered vehicles or machines are refueled, hydrogen gas is transferred from a high-pressure storage vessel to a receiving vessel or a vessel in a vehicle or machine. When filling a receiving vessel, the storage vessel is equilibrated with the receiving vessel. Therefore, the final pressure of hydrogen in the receiving vessel is limited by the initial pressure of the storage vessel. If only one storage vessel is used, the final pressure obtainable in the receiving vessel decreases with the number of times the storage vessel is used for fueling. To increase the final pressure in the receiving vessel, it is known to transfer a gas to a receiving vessel using a plurality of storage vessels so that the receiving vessel is connected to and equilibrated with each of the plurality of storage vessels in turn. The plurality of storage vessels each have different pressures and the receiving vessel is connected to the storage vessels in order of increasing pressure. Therefore, the pressure in the receiving vessel increases as it is connected to subsequent storage vessels. The storage vessels provide a cascade of pressure to which the receiving vessel is connected. This approach enables the later vessels in the plurality of storage vessels to stay at high pressures which helps to provide a higher final pressure in the receiving vessel.

If the storage vessels and/or receiving vessels comprise composite cylinders, the temperature of gas within the vessels as well as the pressure is important when fueling. The addition of the gas into a vessel compresses the gas already present in the vessel leading to an increase in temperature. High temperatures of the gas in the vessel can lead to a weakening or damage in the receiving vessel wall. Thus, the lifetime of the receiving vessel is reduced by high gas temperatures in the receiving vessel. If the vessel is a composite cylinder, such cylinders can be damaged if the temperature of the gas within the cylinder exceeds 85° C. Additionally, as gas is emptied from a vessel the gas remaining inside the vessel expands which causes the temperature to drop. This drop in temperature within the vessel can also lead to a weakening or damage in the storage vessel wall.

To avoid too high or too low gas temperatures in the storage vessels or the receiving vessel, the rate of gas entering and exiting the vessel may be limited. This can result in long fill times for receiving vessels which may not be suitable for all operators. These times can be particularly long when a large number of storage vessels are used in the pressure cascade.

It is an object of embodiments of the invention to at least mitigate one or more of the problems of the prior art. In particular, in certain embodiments, the invention provides an apparatus and method of fueling for optimising the filling time versus temperature of a receiving vessel depending on the operator requirements.

BRIEF SUMMARY OF THE DISCLOSURE

According to a first aspect of the invention, there is provided an apparatus for fueling. The apparatus comprises:
  a plurality of vessels for containing a gas, each vessel of the plurality of vessels being selectively fluidly connectable to at least one receiving vessel; and
  a control means configured to selectively divide the plurality of vessels into a plurality of banks each comprising one or more of the plurality of vessels;
wherein the control means is further configured to sequentially fluidly connect the plurality of banks to the at least one receiving vessel such that when one of the plurality of banks is fluidly connected to the at least one receiving vessel the one or more of the plurality of vessels within that bank are fluidly connected to the at least one receiving vessel but are fluidly isolated from the one or more of the plurality of vessels of the remaining ones of the plurality of banks.

According to a second aspect of the invention, there is provided an apparatus for fueling. The apparatus comprises:
  a plurality of vessels for containing a gas, each vessel of the plurality of vessels being selectively fluidly connectable to at least one receiving vessel; and
  a control means configured to selectively divide the plurality of vessels into a plurality of banks by selecting between allocating one vessel of the plurality of vessels and more than one vessel of the plurality of vessels in each of the plurality of banks;
wherein the control means is further configured to sequentially fluidly connect the plurality of banks to the at least one receiving vessel such that when one of the plurality of banks is fluidly connected to the at least one receiving vessel the one or more of the plurality of vessels within that bank are fluidly connected to the at least one receiving vessel but are fluidly isolated from the one or more of the plurality of vessels of the remaining ones of the plurality of banks. Consequently, each of the plurality of banks comprises one or more of the plurality of vessels.

In embodiments of either the first or second aspects of the invention, one or more of the following may apply.

The plurality of vessels may be for containing a fuel gas.

The control means may be configured to sequentially fluidly connect the plurality of banks to the receiving vessel in order of increasing pressure of the plurality of banks.

The apparatus may comprise a manifold, wherein each vessel of the plurality of vessels is selectively fluidly connectable to the manifold and the manifold is selectively fluidly connectable to the at least one receiving vessel.

The control means may be configured to substantially equilibrate the pressure in the one or more of the plurality of vessels within the plurality of banks before transferring gas from the plurality of banks to the at least one receiving vessel.

In certain embodiments, the apparatus may comprise at least one first restriction arranged to provide a first gas flow rate for gas exiting the plurality of vessels and at least one second restriction arranged to provide a second gas flow rate for gas entering the plurality of vessels, wherein the second gas flow rate is different to the first gas flow rate. In certain embodiments, the first gas flow rate may be greater than the second gas flow rate.

The at least one first restriction may be provided by a non-return valve and the at least one second restriction may comprise a conduit arranged to provide a fluid path which bypasses the non-return valve. The conduit may extend through the non-return valve. The non-return valve may comprise a bore configured to provide the first gas flow rate.

The at least one first restriction may comprise a first restriction for each of the plurality of vessels and the at least one second restriction comprises a second restriction for each of the plurality of vessels.

The first and second restrictions may comprise fixed orifices.

The at least one receiving vessel may comprise a plurality of receiving vessels.

In certain embodiments, the plurality of vessels may contain a fuel gas. The fuel gas may comprise hydrogen.

In certain embodiments, each of the plurality of vessels may comprise a composite cylinder.

In certain embodiments, the fueling apparatus may be a mobile fueling apparatus.

According to a third aspect of the invention, there is provided a method for fueling a receiving vessel. The method comprises:
  selectively dividing a plurality of vessels containing a gas into a plurality of banks each comprising one or more of the plurality of vessels; and
  transferring a gas from the plurality of banks to at least one receiving vessel by sequentially fluidly connecting the plurality of banks to the at least one receiving vessel;
  wherein when one of the plurality of banks is fluidly connected to the at least one receiving vessel the one or more of the plurality of vessels within that bank are fluidly connected to the at least one receiving vessel but are fluidly isolated from the one or more of the plurality of vessels of the remaining ones of the plurality of banks.

According to a fourth aspect of the invention, there is provided a method for fueling a receiving vessel. The method comprises:
  selectively dividing a plurality of vessels containing a gas into a plurality of banks by selecting between allocating one vessel of the plurality of vessels and more than one vessel of the plurality of vessels in each of the plurality of banks; and
  transferring a gas from the plurality of banks to at least one receiving vessel by sequentially fluidly connecting the plurality of banks to the at least one receiving vessel;
  wherein when one of the plurality of banks is fluidly connected to the at least one receiving vessel the one or more of the plurality of vessels within that bank are fluidly connected to the at least one receiving vessel but are fluidly isolated from the one or more of the plurality of vessels of the remaining ones of the plurality of banks. Consequently, each of the plurality of banks comprises one or more of the plurality of vessels.

In embodiments of either the third or fourth aspects of the invention, one or more of the following may apply.

The method may comprise determining the pressure in each of the plurality of banks and ordering the plurality of banks by pressure, wherein sequentially fluidly connecting the plurality of banks to the receiving vessel comprises connecting the plurality of banks in order of increasing pressure.

In certain embodiments, sequentially fluidly connecting the plurality of banks to the at least one receiving vessel may comprise sequentially fluidly connecting the plurality of banks to a manifold, wherein the manifold is fluidly connected to the at least one receiving vessel.

The method may comprise substantially equilibrating the pressure in the one or more of the plurality of vessels in each of the plurality of banks before transferring gas from the plurality of banks to the at least one receiving vessel.

The method may comprise transferring a fuel gas from the plurality of banks to at least one receiving vessel by sequentially fluidly connecting the plurality of banks to the at least one receiving vessel. The fuel gas may comprise hydrogen.

According to a fifth aspect of the invention, there is provided a method of use of the above-described apparatus. The method comprises:
  transferring a first gas from a first bank of the plurality of banks to a first receiving vessel;
  transferring the first gas from the first bank to a second receiving vessel;
  transferring a second gas from a second bank of the plurality of banks to the first receiving vessel; and
  transferring the second gas from the second bank to the second receiving vessel;
  wherein the first gas is the same type as the second gas.

According to a sixth aspect of the invention, there is provided a method of use of the above-described apparatus. The method comprises:
  transferring a first gas from a first bank of the plurality of banks to a first receiving vessel;
  transferring the first gas from the first bank to a second receiving vessel;
  transferring a second gas from a second bank of the plurality of banks to the second receiving vessel; and
  transferring the second gas from the second bank to the first receiving vessel;
  wherein the first gas is the same type as the second gas.

BRIEF DESCRIPTION OF THE DRAWINGS

Embodiments of the invention are further described hereinafter with reference to the accompanying drawings, in which.

DETAILED DESCRIPTION

Figure 1:
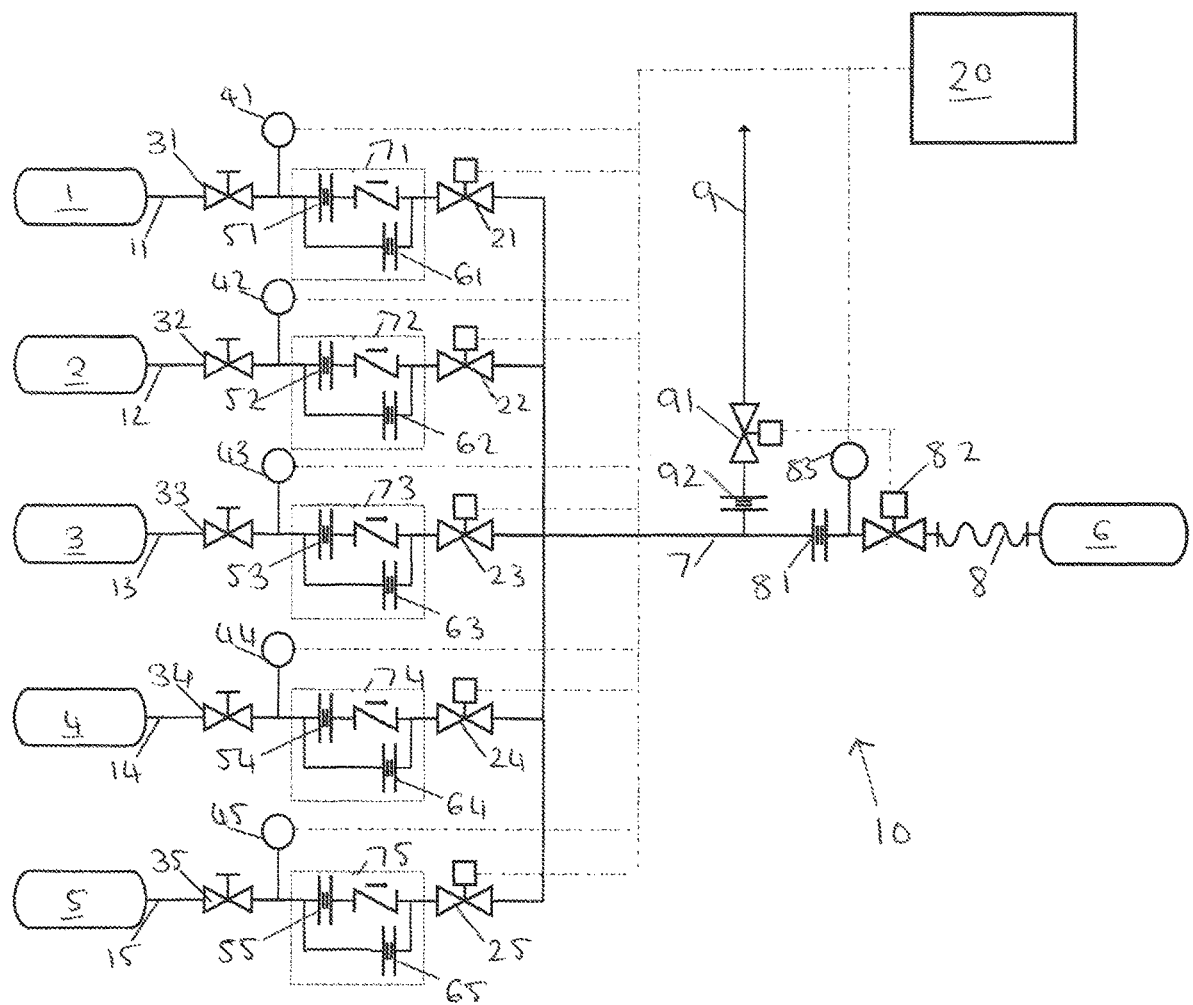
FIG. 1 schematically shows an apparatus according to a first embodiment of the present invention.

FIG. 1 shows an apparatus 10 for fueling according to a first embodiment of the invention. The apparatus 10 comprises a plurality of vessels 1, 2, 3, 4, 5 for containing a gas. The plurality of vessels 1, 2, 3, 4, 5 may comprise a fuel gas such as compressed natural gas or hydrogen. Each of the plurality of vessels 1, 2, 3, 4, 5 may comprise a composite cylinder. However, the apparatus 10 is not limited to such cylinders, any vessel suitable for containing a gas may be used.

The apparatus 10 is configured to transfer gas from the plurality of vessels 1, 2, 3, 4, 5 to a receiving vessel 6 in order to fuel the receiving vessel 6. The receiving vessel 6 may comprise any vessel suitable for fueling. For example, the receiving vessel 6 may be a fuel tank in a vehicle such as a bus or a forklift truck where the fuel tank may comprise a steel cylinder, an aluminium cylinder, a composite cylinder.

To enable the transfer of gas from the plurality of vessels 1, 2, 3, 4, 5 to the receiving vessel 6, each vessel of the plurality of vessels 1, 2, 3, 4, 5 is selectively fluidly connectable to the receiving vessel 6. The receiving vessel 6 is a common receiving vessel for the plurality of vessels 1, 2, 3, 4, 5. Each of the plurality of vessels 1, 2, 3, 4, 5 is selectively fluidly connectable to the receiving vessel 6 such that gas may flow from one of the plurality of vessels 1, 2, 3, 4, 5 to the receiving vessel 6 without passing through another of the plurality of vessels 1, 2, 3, 4, 5. That is, gas can be transferred from one vessel of the plurality of vessels 1, 2, 3, 4, 5 to the receiving vessel 6 independently of the other vessels of the plurality of vessels 1, 2, 3, 4, 5.

In the exemplary embodiment of FIG. 1, the plurality of vessels 1, 2, 3, 4, 5 comprises five vessels: a first vessel 1; a second vessel 2; a third vessel 3; a fourth vessel 4; and a fifth vessel 5. However, the apparatus is not limited to five vessels, and may include any number of vessels. That is, the apparatus 10 may comprise two or more vessels.

In the embodiment of FIG. 1, a fluid path 11, 12, 13, 14, 15 is connected to each of the five vessels. The fluid paths 11, 12, 13, 14, 15 extend from each of the plurality of vessels 1, 2, 3, 4, 5 to a common manifold 7 where the fluid paths 11, 12, 13, 14, 15 converge.

A first fluid path 11 extends from the first vessel 1 to the manifold 7. The first fluid path 11 may be provided within a pipe. In the embodiment shown in FIG. 1, the first fluid path 11 extends from an opening in the first vessel 1 to the manifold 7. As such, fluid may flow from the manifold along the first fluid path then into the opening of the first vessel 1 and fluid may flow out of the opening of the first vessel 1 then along the first fluid path 11 into the manifold. Thus, fluid may enter and exit the first vessel through the same opening. Various components are arranged on the first fluid path 11 to control and measure gas flow between the first vessel 1 and the manifold 7, as is described below.

The apparatus 10 comprises a first control valve 21 on the first fluid path 11. The first control valve 21 is configured to control fluid flow along the first fluid path 11. In the embodiment of FIG. 1, the first control valve 21 is an on/off valve. The first control valve 21 controls the flow of gas in either direction. That is, when the first control valve 21 is open, gas may flow between the first vessel 1 and the manifold 7, and when the first control valve 21 is closed, substantially no gas flows between the first vessel 1 and the manifold 7. The first control valve 21 is connected to the control means 20. The control means 20 is configured to actuate the first control valve 21 to fluidly connect and disconnect the first vessel 1 and the manifold 7. The control means 20 is described further below.

The apparatus 10 comprises a first manual valve 31 on the first fluid path 11. The first manual valve 31 is positioned adjacent to the first vessel 1 and is configured to control gas flow along the first fluid path 11. When the first manual valve 31 is open and the control valve 21 is also open, gas may flow between the manifold 7 and the first vessel 1 and when the first manual valve 31 is closed, no gas flows between the first vessel 1 and the manifold 7. The first manual valve 31 is configured to be manually operated. Whilst the first manual valve 31 is shown in FIG. 1, this valve is optional and, in certain embodiments, may not be included on the first fluid path 11.

Along the first fluid path 11, the apparatus 10 comprises a first pressure transmitter 41. The first pressure transmitter 41 is positioned between the control valve 21 and the first vessel 1 on the first fluid path 11. The first pressure transmitter 41 is configured to measure the pressure or change in pressure of gas in the first fluid path 11. The first pressure transmitter 41 is coupled to the control means 20. The first pressure transmitter 41 is configured to transmit (i.e. communicate a signal indicative of) measurements of gas pressure in the first fluid path 11 to the control means 20. In alternative embodiments, the first pressure transmitter 41 may be replaced by a first mass flow rate meter or a first mass flow rate meter may be included in addition to the first pressure transmitter 41. The first mass flow meter may be configured to measure the flow of gas along the first fluid path 11. In such embodiments, the first mass flow rate meter may be coupled to the control means 20. The first mass flow rate meter may be configured to transmit measurements of gas flow in the first fluid path 11 to the control means 20.

The apparatus 10 comprises a first restriction 51 and a second restriction 61 to limit the gas flow rate between the manifold 7 and the first vessel 1 along the first fluid path 11.

The first restriction 51 is arranged to provide a first gas flow rate for gas exiting the first vessel 1 i.e. in a direction from the first vessel 1 to the manifold 7. The first restriction 51 comprises a narrowing in the first fluid path 11 so as to reduce the flowrate of gas flowing along the first fluid path 11 in a direction from the first vessel 1. Thus, the first restriction 51 limits the rate at which gas exits the first vessel 1. During use, as gas exits the first vessel 1, the gas that remains inside the first vessel 1 expands and cools. Limiting the gas flow rate for gas exiting the first vessel 1 helps to control the change in pressure in the first vessel 1 and, consequently, the cooling within the first vessel 1. Thus, the risk of damage to the first vessel 1 due to the drop in temperature is reduced. In certain embodiments, the first restriction 51 may be provided by a variable valve such that the limiting of the gas flow rate along the first fluid path 11 may be varied.

The second restriction 61 is configured to provide a second gas flow rate for gas entering the first vessel 1 i.e. in a direction from the manifold 7 to the first vessel 1. Thus, the first restriction 51 limits the gas flow rate in one direction and the second restriction 61 limits the gas flow rate in the other direction along the first fluid path 11. The second restriction 61 comprises a narrowing in the first fluid path 11 so as to reduce the flowrate of gas flowing along the first fluid path 11 into the first vessel 1. During use, when new gas enters the first vessel 1, the new gas compresses any gas already present in the first vessel 1. The new gas may enter the first vessel 1 when, for example, the first vessel 1 is refilled. The compression increases the temperature within the first vessel 1 which may damage the vessel. By limiting the gas flow rate for gas entering the first vessel 1, the second restriction 61 helps to control the change in temperature in the first vessel 1, reducing the risk of damage to the first vessel 1.

The first and second restrictions 51, 61 are configured such that first gas flow rate may differ from the second gas flow rate. The rate at which gas can be safely received within a vessel without causing damage may differ from the rate at which gas can be emptied from the vessel without causing damage. Providing two restrictions reduces the risk of damage to the apparatus 10 during use without requiring additional controls to regulate the gas flow rate. In certain embodiments, the first gas flow rate may be greater than the second gas flow rate because for vessels such as composite cylinders, gas can leave a vessel at a higher rate than gas can enter without risking damage to the vessel.

In the embodiment of FIG. 1, the first and second restrictions 51, 61, may be provided within a modified non-return valve 71. An exemplary non-return valve may comprise a bore through which fluid can flow and a plunger configured to allow fluid to pass in a first direction but seal the bore to prevent fluid flow in the opposite direction. The non-return valve may comprise a spring which biases the plunger to seal the bore. When fluid travels in the first direction, the fluid acts on the plunger and compresses the spring. The compression of the spring opens the bore so that fluid can flow in the first direction. When fluid travels in a second direction opposite to the first direction, the spring is not compressed, and the plunger inhibits fluid flow in the second direction. The modified non-return valve 71 is not limited to this type of non-return valve as non-return valves may be provided with alternative means to allow fluid flow in one direction whilst inhibiting fluid flow in the opposite direction.

The modified non-return valve 71 comprises a non-return valve and a conduit arranged to provide a fluid path which bypasses the non-return valve. The first restriction 51 is provided by the non-return valve. The non-return valve is configured to allow gas to flow into the first vessel but inhibit the flow of gas in a direction from the first vessel. The bore of the non-return valve may be sized so as to provide the first restriction 61. For example, the bore may be from 1.5 to 2.0 mm in diameter, 1.6 to 1.8 mm in diameter, or 1.7 mm in diameter to provide a suitable first gas flow rate. The second restriction 61 comprises the conduit arranged to provide the fluid path which bypasses the non-return valve. Thus, the conduit enables gas to flow in a direction from the first vessel to the manifold. The conduit may extend through the non-return valve, for example by extending through the plunger of the non-return valve, or around the non-return valve, for example by bypassing the plunger. The conduit may be sized so as to provide the second gas flow rate. For example, in certain embodiments, the conduit may be from 0.5 to 0.9 mm in diameter, 0.6 to 0.8 mm in diameter or 0.7 mm in diameter to provide a suitable second gas flow rate. In other embodiments (e.g. with vessels of different sizes), conduits of different diameters may be used. The modified non-return valve 71 enables the first and second restrictions to be provided with a single component reducing the risk of leaks occurring on the first fluid path 11.

As shown in FIG. 1, a second 12, a third 13, a fourth 14 and a fifth 15 fluid path extend from the second vessel 12, the third vessel 13 the fourth vessel 14 and the fifth vessel 15 to the manifold 7, respectively. The second 12, third 13, fourth 14 and fifth 15 fluid paths and the components along these fluid paths are the same as those described above in relation to the first fluid path 11. Therefore, to avoid repetition, the second 12, third 13, fourth 14 and fifth 15 fluid paths will not be described in detail.

As described above, the fluid paths 11, 12, 13, 14, 15 converge at the common manifold 7. Thus, each of the plurality of vessels 1, 2, 3, 4, 5 are selectively fluidly connectable to the manifold 7. During use, the control valves 21, 22, 23, 24, 25 and manual valves 31, 32, 33, 34, 35 on each of the first 11, second 12, third 13, fourth 14 and fifth 15 fluid paths may be used to control the flow of gas between each of the plurality of vessels 1, 2, 3, 4, 5 into the manifold 7.

The manifold 7 is also selectively fluidly connectable to the receiving vessel 6. Therefore, gas can flow from each of the plurality of vessels 1, 2, 3, 4, 5 to the manifold 7 and from the manifold 7 into the receiving vessel 6. Thus, each of the plurality of vessels 1, 2, 3, 4, 5 is selectively fluidly connectable to the receiving vessel 6 via the manifold 7.

The apparatus 10 comprises a hose 8 configured to fluidly connect the manifold 7 to the receiving vessel 6 so that gas may be transferred to the receiving vessel 6. The hose 8 is connectable to the receiving vessel 6. Between the manifold 7 and the hose 8, the apparatus 10 may comprise an optional output restriction 81 configured to provide a third gas flow rate for gas entering the receiving vessel 6. The output restriction 81 comprises a narrowing in a fluid path between the manifold 7 and the hose 8 to reduce the flowrate of gas flowing from the manifold 7 to the receiving vessel 6. Thus, the output restriction 81 limits the rate at which gas enters the receiving vessel 6. The output restriction 81 may comprise a fixed orifice. The area of the orifice may be sized to limit the gas flow rate. In the same manner as the first and second restrictions 51, 61, the output restriction 81 limits the gas flow rate to reduce the risk of damage to the receiving vessel 6 and the manifold 7.

The apparatus 10 comprises an output control valve 82 on the fluid path between the manifold 7 and the hose 8. The output control valve 82 is configured to control the fluid flow between the manifold 7 and the hose 8. When the output control valve 82 is open, gas may flow between the manifold 7 and the hose 8 and when the output control valve 82 is closed, substantially no gas flows between the manifold 7 and the hose 8. The output control valve 82 may comprise the same type of valve as the first control valve 21 described above. In the same manner as the first control valve 21, the output control valve 82 is connected to and actuatable by the control means 20.

On the fluid path between the manifold 7 and the hose 8, the apparatus 10 comprises an output pressure transmitter 83. The output pressure transmitter 83 is configured to measure the pressure or change in pressure of gas flow between the manifold 7 and the hose 8. The output pressure transmitter 83 is coupled to the control means 20. The output pressure transmitter 83 is configured to transmit (i.e. communicate signals indicative of) measurements of gas pressure to the control means 20. In alternative embodiments, the output pressure transmitter 83 may be replaced by an output mass flow rate meter or an output mass flow rate meter may be included in addition to the output pressure transmitter 83. The output mass flow rate meter may be configured to measure the flow of gas between the manifold 7 and the hose 8. In such embodiments, the output mass flow meter may be coupled to the control means 20. The output mass flow rate meter may be configured to transmit measurements of gas flow to the control means 20.

The apparatus 10 comprises a bleed vent 9 that is selectively fluidly connectable to the manifold 7. A vent control valve 91 may be provided for controlling the flow of gas along the vent 9. The vent control valve 91 may be coupled to and actuatable by the control means 20. Vent 9 may be used to bleed the manifold 7. During use, bleeding of the manifold 7 may improve the ease of disconnecting the receiving vessel 6 from the apparatus 10. A vent restriction 92 may be provided to control the rate of gas flow along the vent 9. In the same manner as the first and second restrictions 51, 61, the vent restriction 92 limits the gas flow rate to reduce the risk of damage to the manifold 7 and restrict the flowrate at which gas exits the vent 9. Whilst the vent 9 is shown in FIG. 1, it is optional and, in certain embodiments, may not be included in the apparatus 10.

As described above, the apparatus 10 comprises the control means 20. The control means 20 is configured to selectively divide the plurality of vessels 1, 2, 3, 4, 5 into a plurality of banks each comprising one or more of the plurality of vessels 1, 2, 3, 4, 5. That is, the control means 20 is configured to select between allocating one vessel of the plurality of vessels 1, 2, 3, 4, 5 and more than one vessel of the plurality of vessels 1, 2, 3, 4, 5 in each of the plurality of banks. The number of vessels in each bank may be chosen depending on any one or more of the following criteria: the type (i.e. material) of the receiving vessel 6, the size of the receiving vessel 6, how many vessels will be filled by the apparatus 10 and the time required to fill the receiving vessel 6, among other considerations. In the embodiment shown in FIG. 1, the control means 20 may, for example, selectively divide the plurality of vessels 1, 2, 3, 4, 5 into two banks by allocating the first 1 and second 2 vessels into a first bank and the third 3, fourth 4 and fifth 5 vessels into a second bank. Alternatively, the control means 20 may, for example, selectively divide the plurality of vessels 1, 2, 3, 4, 5 into five banks by allocating each of the first 1, second 2, third 3, fourth 4 and fifth 5 vessels into separate banks. By providing a control means 20 which selectively divides the vessels 1, 2, 3, 4, 5 into banks, the apparatus 10 may be optimally configured depending on the size, number and type of receiving vessel 6 to be fueled and the time taken to fill the receiving vessel 6. Thus, the apparatus 10 can be configured in accordance with the required or desired operating conditions. If the desired operation conditions are to fuel the receiving vessel 6 as quickly as possible, the control means 20 may divide the plurality of vessels 1, 2, 3, 4, 5 into a small number of banks. For example, the apparatus 10 of FIG. 1 may be divided into two banks, e.g. the first bank comprising three vessels and the second bank comprising two vessels. This arrangement results in the greatest pressure difference between the receiving vessel 6 and each bank thereby providing the highest flow rate of gas into the receiving vessel 6. However, dividing the apparatus 10 into two banks reduces the total amount of gas that can be extracted from the apparatus 10 compared to dividing the apparatus into five banks with one of the plurality of vessels 1, 2, 3, 4, 5 in each bank. Thus, when using a small number of banks the apparatus 10 may need to be refilled with gas more frequently than when a larger number of banks is used. If the desired operation conditions are to reduce the frequency at which the gas within the apparatus 10 needs to be refilled, the control means 20 may divide the plurality of vessels 1, 2, 3, 4, 5 into the largest possible number of banks. For example, the apparatus 10 of FIG. 1 may be divided into five banks with one of the plurality of vessels 1, 2, 3, 4, 5 in each bank. The difference in pressure between each bank and the receiving vessel 6 is minimised in such an arrangement which enables a greater amount of the gas within the apparatus 10 to be used for fueling compared to a smaller number of banks. However, when a large number of banks are used the time to fuel the receiving vessel 6 is longer than when a smaller number of banks are used.

The control means 20 may be configured to receive a user input identifying the number of banks required and the number of vessels 1, 2, 3, 4, 5 in each bank. Alternatively, the control means 20 may be configured to receive a user input identifying the type, size and/or number of receiving vessels 6 that are to be filled. In alternative embodiments, the control means 20 may receive one or more signals indicative of such parameters, such that a user input is not required. The control means 20 may then determine the appropriate number of banks into which the plurality of vessels 1, 2, 3, 4, 5 are divided. Example 1 and Example 2 described below provide comparisons of different configurations of the plurality of banks and the performance of the banks for different receiving vessels.

The control means 20 is further configured to sequentially fluidly connect the plurality of banks to the receiving vessel 6 to transfer gas into the receiving vessel 6. Thus, gas is transferred from each of the plurality of banks in turn to the receiving vessel 6. Since the first, second, third, fourth and fifth vessels 1, 2, 3, 4, 5 are each selectively fluidly connectable to the receiving vessel 6, gas can be transferred from the first, second, third, fourth and fifth vessels 1, 2, 3, 4, 5 to the receiving vessel 6 regardless of how the vessels 1, 2, 3, 4, 5 are arranged into banks. The control means 20 is configured to sequentially fluidly connect the plurality of banks such that when one of the plurality of banks is fluidly connected to the receiving vessel 6 the one or more plurality of vessels 1, 2, 3, 4, 5 within that bank are connected to the receiving vessel 6 but are fluidly isolated from the one or more of the plurality of vessels 1, 2, 3, 4, 5 of the remaining ones of the plurality of banks. Therefore, in the above-described example in which two banks are selected by the control means 20, when the first bank is fluidly connected to the receiving vessel 6, the first and second vessels 1, 2 are fluidly connected to the receiving vessel 6 and fluidly isolated from the third, fourth and fifth vessels 3, 4, 5 so that gas only flows from the first and second vessels 1, 2 into the receiving vessel 6. The third, fourth and fifth vessels 3, 4, 5 are fluidly isolated from the receiving vessel 6.

The control means 20 may be configured to sequentially fluidly connect the plurality of banks to the receiving vessel 6 in order of increasing pressure of the plurality of banks. That is, the banks form a cascade of pressure and are sequentially connected to the receiving vessel 6 starting with the lowest pressure bank and ending with the highest pressure bank. The control means 20 may be configured to determine the pressure in each of the plurality of banks and determine the order of the plurality of banks by pressure to then sequentially fluidly connect the plurality of banks to the receiving vessel 6 in increasing pressure. Connecting the banks in this sequence may enable later banks to stay at a higher pressure which helps to provide a higher final pressure in the receiving vessel 6.

To fuel the receiving vessel 6, the receiving vessel 6 is connected to the hose 8 of the apparatus 10. Preferably, before the apparatus 10 has been used for fueling, the pressures in each of the plurality of vessels 1, 2, 3, 4, 5 are substantially the same as one another. The temperatures in each of the plurality of vessels 1, 2, 3, 4, 5 may be substantially the same as one another. The plurality of vessels 1, 2, 3, 4, 5 are then selectively divided into the plurality of banks depending on the fueling requirements of the user (or the application). However, the order of connection of the receiving vessel 6 to the hose 8 may be reversed. When the apparatus 10 is being used to fuel a receiving vessel 6, the manual valves 31, 32, 33, 34, 35 on the fluid paths 11, 12, 13, 14, 15 are opened. For illustrative purposes, in the following discussion it will be assumed that the control means 20 selectively divides the plurality of vessels 1, 2, 3, 4, 5 into three banks by allocating the first and second vessels 1, 2 into a first bank and the third and fourth vessels 3, 4 into a second bank and the fifth vessel 5 into a third bank.

The gas in the plurality of vessels 1, 2, 3, 4, 5 is transferred to the receiving vessel 6 by sequentially fluidly connecting the plurality of banks to the receiving vessel 6. That is, the first bank is fluidly connected to the receiving vessel 6 and then the second bank is fluidly connected to the receiving vessel 6. This may be done by the control means 20 opening the output control valve 82 and the control valves 21, 22 on the first and second fluid paths 11, 12. The control valves 23, 24, 25 on the third, fourth and fifth fluid paths 13, 14, 15 remain closed, as does the vent valve 91. This enables gas to flow from the first bank into the receiving vessel 6. The gas flows out of the first and second vessels 1, 2, through the first restrictions 51, 52 on first and second fluid paths 11, 12 and into the manifold 7. The gas then flows from the manifold 7, through the output restriction 81 into the receiving vessel 6. The gas may flow from the first and second vessels 1, 2 into the receiving vessel 6 until the first vessel 1, second vessel 2 and receiving vessel 6 have reached substantially the same pressure as one another or the gas flow rate falls below a minimum specified valve. The pressure transmitters 41, 42 on the first and second fluid paths 11, 12 and the output pressure transmitter 83 send the pressure measurements to the controls means. The control means 20 may be configured to determine when pressure requirements of the first vessel 1, the second vessel 2 and the receiving vessel 6 have been reached. Once these conditions have been met, the control means 20 closes the control valves 21, 22 on the first and second fluid paths 11, 12.

The control means 20 then opens the control valves 23, 24 on the third and fourth fluid paths 13, 14 (whilst the control valves 21, 22, 25 on the first, second and fifth fluid paths 11, 12, 15 are closed) so that gas is transferred from the second bank to the receiving vessel 6 in the same manner as used for the first bank. Finally, the control means 20 then opens the control valve 25 on the fifth fluid path 15 (whilst the control valves 21, 22, 23, 24 on the first, second third and fourth fluid paths 11, 12, 13, 14 are closed) so that gas is transferred from the third bank to the receiving vessel 6 in the same manner as used for the first bank.

Once sufficient gas has been transferred from the banks into the receiving vessel 6, the control valves 21, 22, 23, 24, 25, 82 are closed, and the receiving vessel 6 may be disconnected from the hose 8. The transferring of gas into the receiving vessel 6 may end once all of the plurality of banks have been used to transfer gas into the receiving vessel 6 or when the pressure in the receiving vessel 6 has reached a desired level. To ease removal of the receiving vessel 6, the vent control valve 91 may be opened to bleed the manifold 7. The reduction in pressure in the manifold 7 may ease removal of the receiving vessel 6 from the apparatus 10.

After the receiving vessel has been fueled, the plurality of vessels 1, 2, 3, 4, 5 are no longer at the same pressure as one another. The first and second vessel 1, 2 in the first bank are each at a first pressure, the third and fourth vessels 3, 4 in the second banks are each at a second higher pressure and the fifth vessel 5 in the third bank is at a third pressure. If the transfer of gas described above between each of the banks and the receiving vessel 6 stopped when each bank and the receiving vessel reached substantially the same pressure, then third pressure would be the highest pressure and the first pressure the lowest pressure of the banks. Transferring gas from the plurality of vessels 1, 2, 3, 4, 5 into the receiving vessel 6 causes the temperature of gas within the plurality of vessels 1, 2, 3, 4, 5 to fall. As a portion of gas is transferred from one of the plurality of vessels 1, 2, 3, 4, 5 into the receiving vessel 6, the gas remaining within that vessel 1, 2, 3, 4, 5 expands. This expansion occurs substantially isentropically which leads to the temperature of the gas remaining in the vessel 1, 2, 3, 4, 5 to decrease. The change in temperature during this expansion depends on the speed at which pressure drops in the vessel and the total pressure drop within the vessel. The faster the speed at which pressure drops in a vessel, the greater the drop in temperature. Therefore, after the receiving vessel has been fueled, the plurality of vessels 1, 2, 3, 4, 5 are not at the same temperature as one another.

Further receiving vessels may be attached to the hose 8, so that the apparatus 10 may be used to fuel more vessels. The same banks may be used to fuel the further receiving vessels in the same order. The control means 20 may be used to determine the pressure in each of the plurality of banks and order the plurality of banks by pressure before sequentially fluidly connecting the plurality of banks to the receiving vessel. In this way, the plurality of banks may be optimally connected to the receiving vessel 6 in order of increasing pressure. The banks now provide a cascade in pressure. The apparatus 10 can be used to fuel receiving vessels until the pressure in the third bank is too low to fill a receiving vessel to a desired pressure. The plurality of vessels 1, 2, 3, 4, 5 then need to be refilled before the apparatus 10 can fuel additional vessels.

Emptying and refilling the plurality of vessels 1, 2, 3, 4, 5 fatigues the vessel walls. When a vessel is in the first bank, most of the gas is emptied from the vessel when the apparatus 10 is used to fuel multiple receiving vessels. When the vessel is used in a later bank, less gas is emptied from the vessel during the fueling process. Thus, the inclusion of a vessel in the first bank has a larger impact on the fatigue life of the vessel in contrast to a scenario in which the vessel is included in a later bank. Once the plurality of vessels 1, 2, 3, 4, 5 have been refilled, the plurality of vessels 1, 2, 3, 4, 5 are once again at the same pressure as one other. Before fueling another receiving vessel from the refilled vessels, the control means 20 may arrange the plurality of vessel into banks to make the fatigue life more uniform across the plurality of vessels over multiple fueling cycles. The selective division of the plurality of vessels 1, 2, 3, 4, 5 into the plurality of banks by the control means 20 may be done by allocating vessels which were in the first bank before the apparatus 10 was refilled to a later bank when the apparatus 10 is used after it has been refilled. The apparatus 10 may comprise a counting means coupled to the control means 20. The counting means may be configured to count the number of times each vessel in the plurality of vessels is substantially emptied (or whose fill level drops below a predetermined threshold) to provide the control means 20 with a measure of the fatigue life of each vessel.

After the apparatus has been used to fill one or more receiving vessels but before the plurality of vessels need refilling, the control means 20 may be used to divide the plurality of vessels 1, 2, 3, 4, 5 into a different number of banks. This may be done if the operation requirements of the apparatus 10 change, for example if the type of receiving vessel 6 to be fueled changes. Alternatively, as the apparatus 10 is used to fill receiving vessels the pressure of gas within the apparatus 10 decreases and the flow rate of gas from the apparatus 10 into the receiving vessels decreases. Thus, it may be necessary to change the plurality of banks to meet a desired filling speed of the receiving vessels. The control means 20 may be used to determine the pressure in each of the re-configured plurality of banks and order the banks by pressure before sequentially fluidly connecting the plurality of banks to the receiving vessel 6 so that the plurality of banks are connected to the receiving vessel in order of increasing pressure.

To re-configure the plurality of banks, the control means 20 may be used to re-configure the plurality of vessels 1, 2, 3, 4, 5 from the three banks described in the above example into two banks where the first bank includes the first and second vessels 1, 2 and the second bank includes the third, fourth and fifth vessels 3, 4, 5. The apparatus 10 may then be used to transfer gas from the two banks to the further receiving vessel to be fueled. Since the third and fourth vessels 3, 4 are at a different pressure to the fifth vessel 5, the apparatus 10 may be used to equilibrate these vessels prior to transferring gas from the re-configured second bank receiving vessel 6. This may be done by the control means 20 closing the output control valve 82 and control valves 21, 22 on the first and second fluid paths 11, 12 and opening the control valves 23, 24, 25 on the third, fourth and fifth fluid paths 13, 14, 15. The third, fourth and fifth vessels 3, 4, 5 are then fluidly connected to the manifold 7 and to each other. Since gas can flow both into and out of the third, fourth and fifth vessels 3, 4, 5 through their respective first and second restrictions 53, 54, 55, 63, 64, 65, the gas in the third, fourth and fifth vessels 3, 4, 5 and the manifold 7 can reach substantially the same pressure. Once these vessels 3, 4, 5 and the manifold 7 have substantially reached equilibrium gas can be transferred from the second bank to the receiving vessel 6. Whilst the apparatus 10 can be used in this manner, it is not necessary to equilibrate the vessels 3, 4, 5 in the re-configured second bank before transferring gas to the receiving vessel 6. If the third, fourth and fifth vessel 3, 4, 5 are fluidly connected to the receiving vessel 6 without being equilibrated, then the gas flow rate from the third and fourth vessels 3, 4 to the receiving vessel 6 will differ to the gas flow rate from the fifth vessel 5. In particular, the flowrate will be higher from the from vessels having higher pressure. As such, after this (non-equilibrated) bank configuration has been used to fill the receiving vessel 6 for an extended period of time, the vessels will come close to equilibrium (due to higher pressure gas flowing into vessels having lower pressure than the receiving vessel 6).

However, due to the first restrictions 53, 54, 55 on each of the third, fourth and fifth fluid paths 13, 14, 15 the gas flow rates are limited so that risk of damage to the vessels 3, 4, 5 is reduced.

In certain embodiments, the control means 20 may be configured to allocate the plurality of vessels 1, 2, 3, 4, 5 into banks depending on the temperature of each of the plurality of vessels 1, 2, 3, 4, 5. In such embodiments, the apparatus 10 may comprise a temperature sensing means (not shown) coupled to each vessel configured to provide a temperature of the gas within each vessel. Each temperature sensing means may be coupled to the control means 20 and configured to transmit temperature measurements to the control means 20. Allocating vessels into banks depending on the vessel temperature may be particularly advantageous when filling the further receiving vessels after an initial receiving vessel 6 has been filled. As described above, the plurality of vessels 1, 2, 3, 4, 5 are not at the same temperature as one another after filling a receiving vessel 6. Additionally, use of the apparatus 10 to fuel further receiving vessels may result in a further decrease of the temperature within each of the plurality of vessels 1, 2, 3, 4, 5. If the temperature in the plurality of vessels 1, 2, 3, 4, 5 falls below a temperature threshold the vessel may be damaged. The temperature threshold depends on the type of vessel. For example, if the plurality of vessels 1, 2, 3, 4, 5 comprise composite cylinders such cylinders may be damaged if the temperature of gas within the cylinder falls below the temperature threshold of −40° C.

The control means 20 may be configured to allocate at least the vessels having the lowest temperatures into banks that include more than one vessel of the plurality of vessels 1, 2, 3, 4, 5. For example, when allocating the vessels into three banks where the first bank includes three of the plurality of vessels 1, 2, 3, 4, 5 and the second and third banks each include one of the plurality of vessels 1, 2, 3, 4, 5, the control means 20 may allocate the three vessel of the plurality of vessels 1, 2, 3, 4, 5 which have the lowest temperature into the first bank. Allocating the coldest vessels into banks that include more than one vessel limits the further drop in temperature within those vessels when fueling a further receiving vessel. This is because the speed at which gas exits a vessel when it is within a bank comprising more than one vessel is slower than the speed at which gas exits a vessel when it is within a bank comprising a single vessel. If all of the plurality of vessels 1, 2, 3, 4, 5 have temperatures close to the threshold temperature, each of the plurality of banks may comprise more than one vessel.

Additionally or alternatively, the control means may be configured to allocate vessels having the low temperatures and a high or similar pressure relative to other vessels in the plurality of vessels 1, 2, 3, 4, 5 into banks which connected to the receiving vessel towards the end of fueling. Thus, such vessels are not allocating into the first bank which is connected to the receiving vessel. Banks used to fuel the receiving vessel towards the end of fueling generally dispense less gas than those used at the start of the fueling. Thus, the temperature drop within these vessels is smaller than those included in the first bank used during fueling.

The temperature of the gas within each of the plurality of vessels 1, 2, 3, 4, 5 also depends on the ambient temperature, the temperature of gas with which the vessel was filled and the thermal and heat transfer properties of the vessel. Thus, if sufficient time elapses between the apparatus 10 being used for fueling a first receiving vessel and a second receiving vessel, each of the plurality of vessels 1, 2, 3, 4, 5 may have warmed up to a temperature significantly above the threshold temperature of each vessel. In such cases, any of the plurality of vessels 1, 2, 3, 4, 5 may be allocated to any of the plurality of banks by the control means 20 when filling the second receiving vessel.

Providing a control means 20 configured to selectively divide the plurality of vessels 1, 2, 3, 4, 5 into a plurality of banks enables the apparatus 10 to be configured to meet the requirements of different operating conditions and enable the apparatus 10 to be re-configured if there are any changes to the operating conditions. The following examples illustrate the effects of different numbers of banks when filling a series of receiving vessels.

Example 1

In this example, an apparatus similar to the embodiment shown in FIG. 1 is used to transfer gas to a series receiving vessels. However, the apparatus of FIG. 1 is modified so that the plurality of vessels comprises nine vessels. Each vessel of the plurality of vessels comprises a composite material and has a volume of 1650 litres. Each receiving vessel in the series comprises a composite material and has a volume of 1000 litres. Since the plurality of vessels and the receiving vessels are made of a composite material, the first restrictions and output restrictions in the apparatus comprise orifices having a diameter of 1.6 mm. Initially, before any gas is transferred to the series of receiving vessels, each of the plurality of vessels contain gas at a pressure of 350 bar and a temperature of 15° C. Each receiving vessel in the series of receiving vessels contains gas at a pressure of 60 bar and a temperature of 15° C.

This example compares the transfer of gas to the series of receiving vessels when the plurality of vessels in the apparatus is divided into three different configurations of banks. The configurations include: a nine stage configuration where the plurality vessels are divided into nine banks where each bank comprises one vessel; a four stage configuration where the plurality of vessels are divided into four banks where the one bank comprises three vessels and the remaining banks each comprise two vessels; and three stage configuration where the plurality of vessels are divided into three banks each comprising three vessels. In the four stage configuration, the larger bank is assigned to transfer gas into the receiving vessels first.

Starting with the apparatus in the above-described initial conditions, the apparatus was used to fill a series of receiving vessels in each of the three configurations. The filling was conducted at an ambient temperature of 15° C. During the filling, sufficient time was left after filling one of the receiving vessels in the series to allow the plurality of vessels in the apparatus to equilibrate to 15° C. before filling the next receiving vessel in the series.

Figure 3:
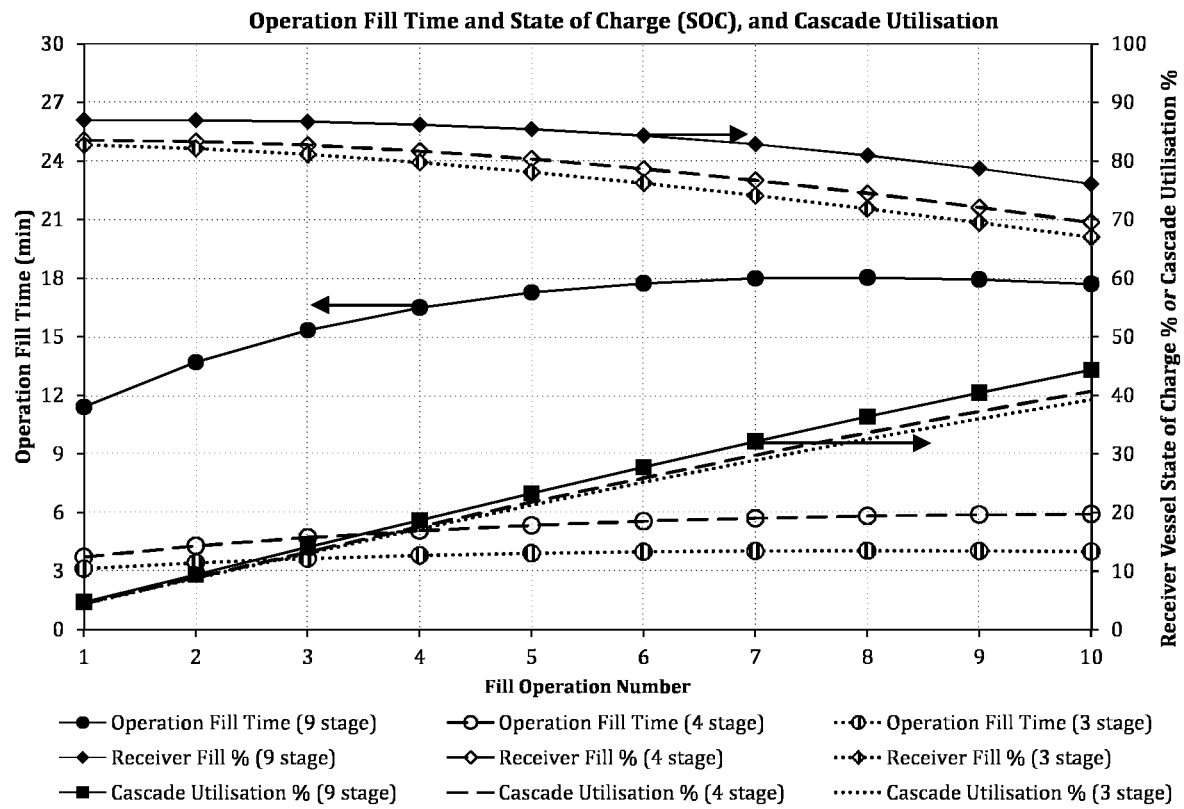
FIG. 3 shows a graph of the effects of different configurations of banks when filling a series of receiving vessels in a first example.

FIG. 3 shows the fill time, the state of charge of the receiving vessel at the end of each fill and the cascade utilisation of the apparatus at the end of each fill of a receiving vessel in the series. Each receiving vessel in the series is shown by an operation number in FIG. 3. The cascade utilisation is equal to the mass of gas dispensed from the apparatus as a proportion of the mass of gas in the apparatus before the series of fill operations.

As FIG. 3 shows, filling a receiving vessel using the three stage configuration took approximately 3 minutes; however, filling a receiving vessel using the nine stage configuration took between 12 and 18 minutes. However, the nine stage configuration was able to fill the receiving vessels to a higher state of charge i.e. to transfer a greater amount of gas into each receiving vessel. The nine stage configuration was also able to use a larger proportion of the gas in the cascade which is shown by the higher cascade utilisation. The three stage configuration was able to fill 3 to 4 receiving vessels to 80% state of charge, whereas the nine stage system was able to fill 8 to 9 receiving vessels to 80% state of charge.

Therefore, the number of banks affects the performance of the apparatus. An operator may select the optimal number of banks to suit their filling requirements. For operators or applications that require faster fills, a configuration with fewer banks can be selected. This decision comes at the penalty of reduced state-of-charge for the receiving vessels and poorer cascade utility. However, if the operator has time to fill the receiving vessels more slowly (or the application permits), or if a slower output restriction is required on the receiving vessel to reduce the flow rate into the receiving vessel further, selecting a higher number of banks is preferable as this maximises the receiver state-of-charge and cascade utility.

As shown in FIG. 3, the time to fill a receiving vessel increases significantly through the series of receiving vessels for the nine stage configuration, from 11 minutes in the first receiving vessel to 18 minutes in the seventh receiving vessel. As described above, the control means of the apparatus can be used to re-configure the number of banks during use. Therefore, the operator could choose to fill the first few vessels with a large number of cascade banks, and once the fill time becomes unacceptable (e.g. 15 minutes after the third fill), switch the configuration to a smaller number of banks to reduce the filling time in the later fills.

Example 2

Figure 4:
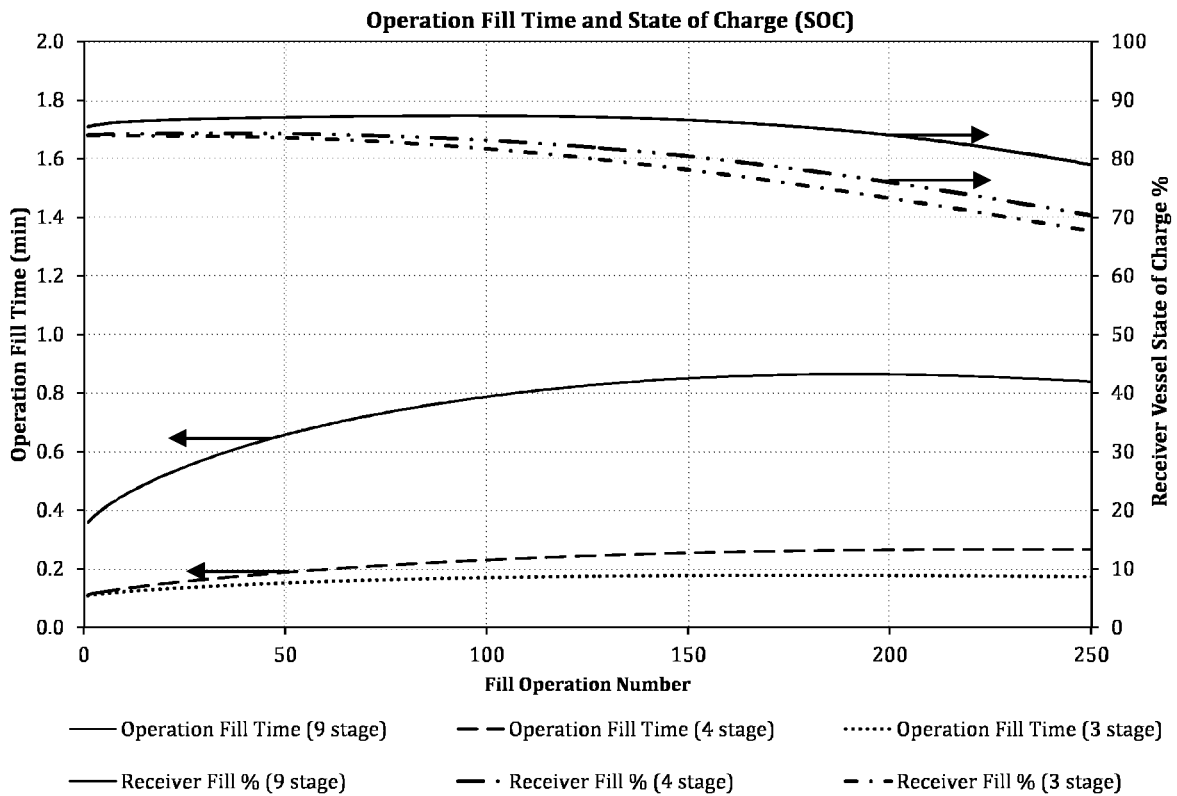
FIG. 4 shows a graph of the effects of different configurations of banks when filling a series of receiving vessels in a second example.

The same procedure was conducted in Example 2 as Example 1, except that each of the receiving vessels comprises a steel vessel having a volume of 42 litres. FIG. 4 shows the results for filling a series of steel receiving vessels for each of the three configurations of banks described in Example 1. FIG. 4 shows the fill time and the state of charge of each receiving vessel at the end of each fill. Each receiving vessel in the series is shown by an operation number in FIG. 4.

The same trends in the fills can be seen with the smaller vessels, however, the absolute time penalty for using a larger number of banks (i.e. the nine stage configuration) is around 30 seconds. When filling one of the receiving vessels, it also takes time before the vessel is filled to connect it to the apparatus and leak test the connection. More time is also required after the vessel is filled to vent the manifold and disconnect the receiving vessel. Therefore, the time penalty of 30 seconds to the operator for using a large number of banks may be minimal compared to the overall time required to connect, fill and disconnect a receiving vessel from the apparatus. When filling small receiving vessels, an operator may choose to select a large number of banks to maximise state of charge in the receiving vessels and the cascade utility. As shown in FIG. 4, the nine stage configuration was able to fill approximately 240 receiving vessels to 80% state of charge, whereas the three stage configuration was only able to fill approximately 120 receiving vessels to 80% state of charge.

As described above, to fuel the receiving vessel 6 gas may be transferred from the plurality of banks to receiving vessel 6 until the vessel 1, 2, 3, 4, 5 within the bank and the receiving vessel 6 have either reached substantially the same pressure as one another or the gas flow rate falls below a minimum specified valve. In certain embodiments, a filling protocol may place a limit on the rate of transfer of gas into the receiving vessel 6. The requirements of the protocol may be influenced by what type of cylinder the receiving vessel is (i.e. the materials of the receiving vessel) and safe temperatures allowable within the receiving vessel. A filing protocol may provide a target pressure ramp rate, a target volumetric flow rate or a target mass flow rate for a receiving vessel and require that the pressure ramp rate, volumetric flow rate or mass flow rate must stay with a particular percentage of the target rate.

When the filling protocol provides a target pressure ramp rate, the target pressure ramp rate then provides a limit on the mass flow rate of gas for filling the receiving vessel 6 below which the mass flow rate should not fall. The limit may be dependent on, for example, the size of the receiving vessel 6, the pressure ramp rate, ambient temperature and gas temperature within the apparatus 10 and receiving vessel 6.

In certain embodiments, the control means 20 may be configured to receive information relating to a filling protocol of the receiving vessel 6. Such information may be received from the receiving vessel 6 or via a user input. Additionally or alternatively, the control means 20 may be configured to derive information, such as the volume of the receiving vessel 6, from the receiving vessel 6. The volume of the receiving vessel 6 may be used to determine the limit on the mass flow rate of gas for filling the receiving vessel 6 for a given filling protocol. The control means 20 may be configured to receive temperature measurements of the ambient temperature and/or the temperature within the receiving vessel 6. The control means 20 may be configured to use the temperature measurements to determine the limit on the mass flow rate of gas for filling the receiving vessel 6 for a given filling protocol. The temperature measurement may be used in addition to the volume of the receiving vessel 6 to determine the limit on the mass flow rate. In such embodiments, the apparatus 10 may comprise temperature sensing means configured to sense the ambient temperature. The control means 20 may be configured to receive the measurement of the temperature within the receiving vessel 6 from the receiving vessel 6 or via a user input. As described above, the control means 20 may receive measurements of gas flow from the output mass flow rate meter on the fluid path between the manifold 7 and the hose 8. The control means 20 may be further configured to stop the flow of gas between one of the plurality of banks and the receiving vessel 6 if the mass flow rate falls below the limit required by the protocol. That is, the bank is disconnected from the receiving vessel 6. Since the control means 20 may be configured to sequentially fluidly connect the plurality of banks to the receiving vessel 6 in order of increasing pressure of the plurality of banks. The control means 20 then fluidly connects the next bank in the order to the receiving vessel 6. Since this bank has a higher pressure than the disconnected bank, the mass flow rate will be above the limit required by the protocol.

The filling protocol may result in a bank being disconnected from the receiving vessel 6 before the bank and the receiving vessel have reached substantially the same pressure. Thus, the filling protocol may reduce the amount of gas than can be transferred from the apparatus 10 to receiving vessels 6 during fueling and require the gas in the apparatus 10 to be refilled more frequently.

As such, before a receiving vessel 6 is fueled the control means 20 may be configured to divide the plurality of vessels 1, 2, 3, 4, 5 into the plurality of banks based on the filling protocol. If the filling protocol requires a relatively fast flow rate of gas into the receiving vessel 6 the control means 20 may arrange the plurality of vessels 1, 2, 3, 4, 5 into a small number of banks e.g. the apparatus 10 of FIG. 1 may be divided into two banks. The small number of banks may reduce the likelihood of a bank being disconnected from the receiving vessel 6 due to the mass flow rate falls below the limit required by the protocol. Thus, the amount of gas that can be transferred from the apparatus 10 to receiving vessels during fueling may be increased. The division of the plurality of vessels 1, 2, 3, 4, 5 into the plurality of banks based on a filling protocol will depend on the pressure in each of the plurality of vessels 1, 2, 3, 4, 5. For example, when the apparatus 10 has recently been refilled, five banks each including one of the plurality of vessels 1, 2, 3, 4, 5 may be able to meet the requirements of a filling protocol. However, once the gas in the plurality of vessels 1, 2, 3, 4, 5 has been depleted after fueling multiple receiving vessels 6, two banks with one including two vessel and the other include three vessels may be required to meet the same filling protocol.

In all of the above-described embodiments, once the control means 20 has divided the plurality of vessels 1, 2, 3, 4, 5 into the plurality of banks, the vessels within each bank remain the same whilst the receiving vessel 6 is being filled. That is, there is no change in the vessels within each bank whilst the apparatus 10 is fluidly connected to the receiving vessel 6. The control means 20 is therefore configured to divide the plurality of vessels 1, 2, 3, 4, 5 into the plurality of banks and to maintain the vessels 1, 2, 3, 4, 5 within each of the plurality of banks whilst the apparatus 10 is fluidly connected to the receiving vessel 6. However, in certain embodiments, the control means 20 may be configured to divide the plurality of vessels 1, 2, 3, 4, 5 into a different plurality of banks whilst the receiving vessel 6 is being filled. The control means 20 may change the plurality of banks in view of the filling protocol to increase the total amount of gas that can be transferred from the apparatus 10 to receiving vessels 6 during fueling. The division of the plurality of vessels 1, 2, 3, 4, 5 into a different plurality of banks may be automated.

As described above, the control means 20 may be configured to disconnect the plurality of banks from the receiving vessel 6 if the mass flow rate falls below the limit required by the protocol. At this point, the control means 20 may then divide the plurality of vessels 1, 2, 3, 4, 5 into a different plurality of banks. The control means 20 may combine the vessels in the bank which has been disconnected from the receiving vessel 6 with the vessels in the bank which is next in the order of increasing pressure of the plurality of banks to form a new bank. This new bank is then fluidly connected to the receiving vessel 6. There is no change to the vessels in the other banks at this time. The control means 20 divide the plurality of vessels 1, 2, 3, 4, 5 into a different plurality of banks whilst the receiving vessel 6 is being filled one or more times during fueling. For example, the control means 20 may initially selectively divide the plurality of vessels 1, 2, 3, 4, 5 into three banks by allocating the first and second vessels 1, 2 into a first bank and the third and fourth vessels 3, 4 into a second bank and the fifth vessel 5 into a third bank where the first bank has the lowest pressure and the third bank has the highest pressure. If, as gas is transferred from the first bank to the receiving vessel 6, the mass flow rate falls below the limit required by the protocol, the first bank is disconnected from the receiving vessel 6. The control means 20 divides the plurality of vessels 1, 2, 3, 4, 5 into a different plurality of banks by combining the first and second vessels 1, 2 and the third and fourth vessels 3, 4 into a new second bank. This new second bank is then fluidly connected to the receiving vessel 6. Transferring gas from the first and second vessels 1, 2 in addition to the third and fourth vessels 3, 4 in the new second bank increases the total amount of gas that can be transferred from the apparatus 10 to receiving vessels during fueling. Thus, the frequency at which the apparatus 10 needs to be refilled is reduced. Once the new second bank has either reached substantially the same pressure as one another or the gas flow rate falls below a minimum specified valve, provided the flow rate has not fallen below the limit required by the protocol, the new second bank is disconnected from the receiving vessel 6 and the third bank is fluidly connected to the receiving vessel 6. If the flow rate from the new second bank falls below the limit required by the protocol, the control means 20 may divide the plurality of vessels 1, 2, 3, 4, 5 into another plurality of banks by combining all of the plurality of vessels into a new third bank. When vessels of different pressures are in the same bank, the vessels at a higher pressure have a higher flow rate into the receiving vessel than the vessels at a lower pressure. Over time, the vessels in the bank will tend towards the same pressure.

If the pressure in the receiving vessel 6 substantially reaches or exceeds the pressure in a vessel within a bank, the control means 20 may be configured to divide the plurality of vessels 1, 2, 3, 4, 5 into a different plurality of banks so that the vessel or vessels with a lower pressure than the receiving vessel 6 are no longer fluidly connected to the receiving vessel 6. In the example described above, if the pressure in the first and second vessels 1, 2 in the new second bank falls below the pressure in the receiving vessel 6, the control means 20 may divide the plurality of vessels 1, 2, 3, 4, 5 into a different plurality of banks by removing the first and second vessels 1, 2 from the new second bank to provide a new third bank which includes the third and fourth vessels 3, 4 only. The new third bank is then fluidly connected to the receiving vessel 6. Additionally or alternatively, the apparatus 10 may comprise two control valves instead of the single first control valve 21 on the first fluid path 11. Each of the two control valves may be configured to control the flow of gas in one direction so that one of the control valves controls gas flow from the first vessel 1 to the manifold 7 and the other control valve controls gas flow from the manifold 7 to the first vessel 1. Each of the second 12, third 13, fourth 14 and fifth 15 fluid paths may similarly comprise two control valves. As such, the control valve which controls gas flow from the manifold into the vessel on each fluid path may be closed as the receiving vessel 6 is being fueled to prevent any gas flow from the receiving vessel 6 into one of the plurality of vessels 1, 2, 3, 4, 5 if the pressure in the receiving vessel 6 substantially reaches or exceeds the pressure in one of the plurality of vessels 1, 2, 3, 4, 5.

Figure 2:
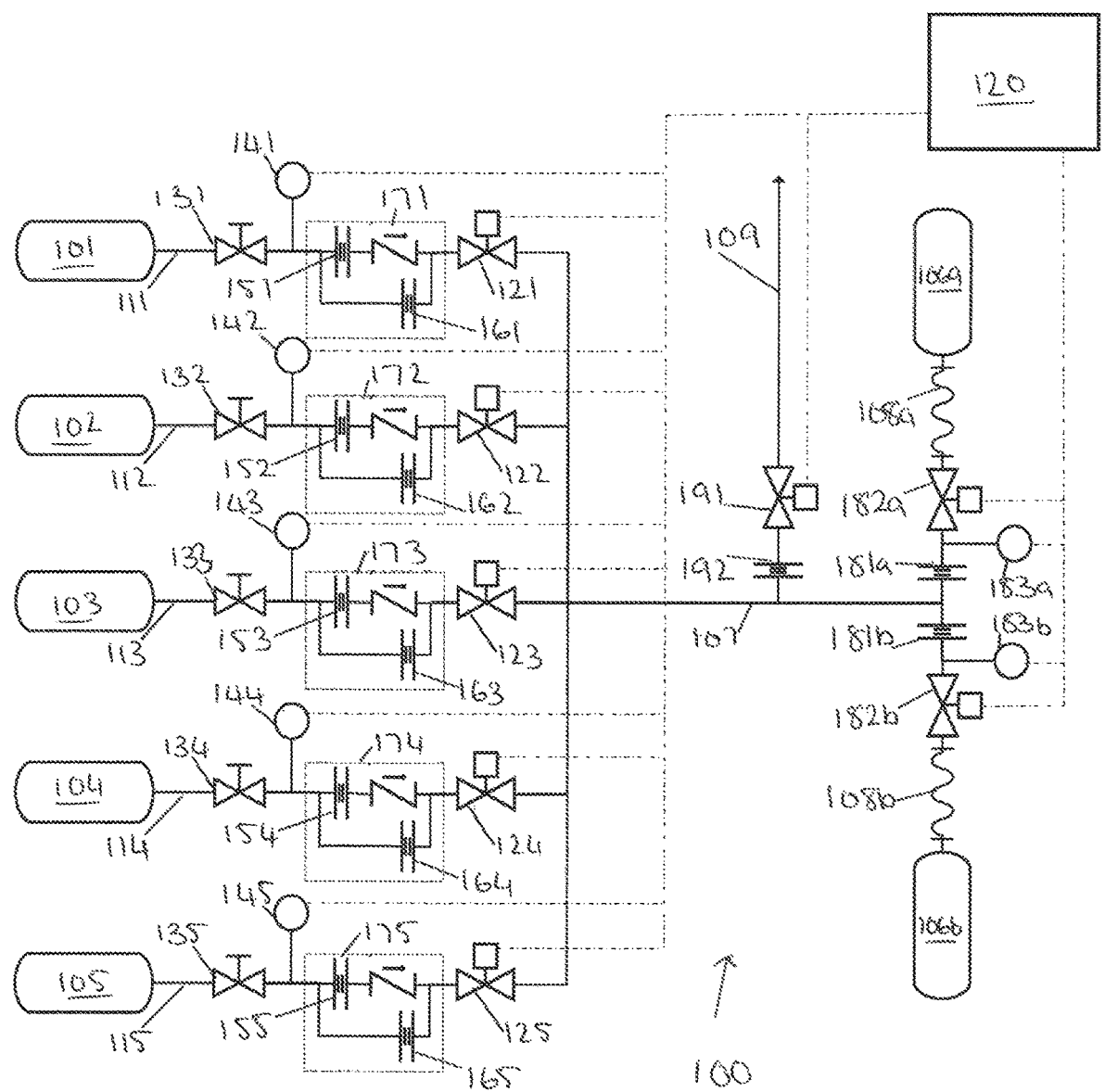
FIG. 2 schematically shows an apparatus according to a second embodiment of the present invention.

FIG. 2 shows an apparatus 100 for fueling according to a second embodiment of the invention. The apparatus 100 of FIG. 2 is the same as that of FIG. 1 except that apparatus 100 of FIG. 2 is connectable to two receiving vessels 106a, 106b. To avoid repetition, only the differences between the embodiments of FIGS. 1 and 2 will be described. Reference numerals in FIG. 2 correspond to those used in FIG. 1 for like features but are transposed by 100.

As shown in FIG. 2, each of the plurality of vessels 101, 102, 103, 104, 105 are selectively fluidly connectable to a manifold 107. The manifold 107 is also is selectively fluidly connectable to the first receiving vessel 106a and the second receiving vessel 106b. Therefore, gas can flow from each of the first, second, third, fourth and fifth vessels 101, 102, 103, 104, 105 to the manifold 107 and from the manifold 107 into one or both of the first receiving vessel 106a and the second receiving vessel 106b.

The apparatus 100 comprises a first hose 108a and a second hose 108b configured to fluidly connect the manifold 107 to the first receiving vessel 106a and the second receiving vessel 106b, respectively, so that gas may be transferred to the receiving vessels 106a, 106b.

Between the manifold 107 and the first hose 108a, the apparatus 100 comprises a first output restriction 181a configured to provide a third gas flow rate for gas entering the first receiving vessel 106a. In the same manner, between the manifold 107 and the second hose 108b, the apparatus 100 comprises a second output restriction 181b configured to provide a fourth gas flow rate for gas entering the second receiving vessel 106b.

The first and second output restrictions 181a, 181b each comprise a narrowing in a fluid path between the manifold 107 and the respective hose to reduce the flowrate of gas flowing from the manifold 107 to the receiving vessels. Thus, the restrictions 181a, 181b limit the rate at which gas enters the first and second receiving vessels 106a, 106b. The first and second output restrictions 181a, 181b may comprise fixed orifices. The cross-sectional area of the orifices may be sized to limit the gas flow rate. In the same manner as the first and second restrictions 51, 61, the first and second output restrictions 181a, 181b limit the gas flow rate to reduce risk of damage to the receiving vessels 106a, 106b and the manifold 107.

The apparatus 100 comprises a first output control valve 182a on the fluid path between the manifold 107 and the first hose 108a and a second output control valve 182b on the fluid path between the manifold 107 and the second hose 106b. The first output control valve 182a and the second output control valve 182b are configured to control fluid flow path between the manifold 107 and the first hose 108a and the second hose 108b, respectively. When the first and second output control valves 182a, 182b are open, gas may flow between the manifold 107 and the respective hoses and when the first and second output control valves 182a, 182b are closed, substantially no gas flows between the manifold 107 and the respective hose. The first and second output control valves 182a, 182b may comprise the same type of valve as the first control valve 21. In the same manner as the first control valve 21, the first and second output control valves 182a, 182b are connected to the control means 120 and the means is configured to actuate the first and second output control valves 182a, 182b.

On the fluid path between the manifold 107 and the first hose 108a, the apparatus 100 comprises a first output pressure transmitter 183a. Similarly, on the fluid path between the manifold 107 and the second hose 108b, the apparatus 100 comprises a second output pressure transmitter 183b. The first and second output pressure transmitters 183a, 183b are configured to measure the pressure or change in pressure of gas flow between the manifold 107 and the first hose 108a and the second hose 108b, respectively. The first and second output pressure transmitters 183a, 183b are coupled to the control means 120. The first and second output pressure transmitters 183a, 183b are configured to transmit (i.e. communicate one or more signals indicative of) measurements of gas pressure to the control means 120. In a similar manner as described above for the apparatus of FIG. 1, in the apparatus 100 of FIG. 2 each of the first and second output pressure transmitters 183a, 183b may be replaced by or supplemented with a mass flow rate meter.

The apparatus 100 of FIG. 2 may be used to transfer gas in a similar manner to the apparatus of FIG. 1. To fuel the first and second receiving vessels 106a, 106b, the first and second receiving vessels 106a, 106b are connected to the first and second hoses 108a, 108b of the apparatus 100. The plurality of vessels 101, 102, 103, 104, 105 are then selectively divided into the plurality of banks depending on the fueling requirements of the user. The gas in the plurality of vessels 101, 102, 103, 104, 105 is then transferred to the first and second receiving vessels 106a, 106b by sequentially fluidly connecting the plurality of banks to the first and second receiving vessels 106a, 106b. In the same manner as described above, the control means 120 may be further configured to stop the flow of gas between one of the plurality of banks and the receiving vessels 106a, 106b if the mass flow rate falls below the limit required by the protocol. The control means 120 may be configured to divide the plurality of vessels 101, 102, 103, 104, 105 into a different plurality of banks whilst the receiving vessels 106a, 106b are being filled depending on the filling protocol.

The apparatus 100 may be used to transfer gas from the plurality of banks into the first and second receiving vessels 106a, 106b. The gas may be transferred to the first and second vessels 106a, 106b simultaneously, by staggering the transfer of gas from each bank into each of the receiving vessels 106a, 106b, by transferring gas from all of the banks to the first receiving vessel 106a and then transferring gas from all of the banks to the second receiving vessel 106b or in any sequence allowable by the apparatus 100. For example, the gas may be transferred from each bank into the first and second receiving vessels 106a, 106b at the same time. This may be done by the control system opening both the first and second output valves 182a, 182b so that gas is transferred from one of the plurality of banks to the manifold 107 and then into the first and second receiving vessels 106a, 106b simultaneously. Alternatively, the gas may be transferred from each bank into the first and second receiving vessels 106a, 106b in a staggered manner. This may be achieved by opening the first output valve 182a whilst the second output valve 182b remains closed so that gas is transferred from one of the plurality of banks into the first receiving vessel 106a. Then the first output valve 182a may be closed and the second output valve 182b opened to that gas from the same bank is transferred into the second receiving vessel 106b. The process may then be repeated for the remaining banks in the plurality of banks. On the other hand, gas may be transferred from all of the banks to the first receiving vessel 106a and then from all of the banks to the second receiving vessel 106b. This may be achieved by opening the first output valve 182a whilst the second output valve 182b remains closed so that gas is transferred from each of the plurality of banks into the first receiving vessel 106a. Then the first output valve 182a may be closed, and the second output valve 182b opened to that gas is transferred from each of the plurality of banks into the second receiving vessel 106b.

The apparatus 10 of FIG. 1 and the apparatus 100 of FIG. 2 may be used in a first filling scheme to transfer gas into two receiving vessels in a staggered manner. The apparatus 10, 110 may be used to first transfer a first gas from a first bank of the plurality of banks to a first receiving vessel and then transfer the first gas from the first bank to a second receiving vessel. Next, the apparatus 10, 110 may be used to transfer a second gas from a second bank of the plurality of banks to the first receiving vessel and then transfer the second gas from the second bank to the second receiving vessel. These steps may be repeated for one or more further banks in the apparatus 10, 110. Since the first and second gases are contained with one or more of the plurality of vessels in each bank, the first and second gases are the same type of gas. When the apparatus of FIG. 1 is used, the first and second receiving vessels must be connected and disconnected from the apparatus between the steps of the filling scheme. When the apparatus of FIG. 2 is used, the first and second receiving vessels may both be connected to the apparatus before the filling schemes are implemented and remain connected throughout the filling scheme. The control means 120 actuates the control valves in the apparatus to implement the filling schemes. Use of the apparatus 100 for the first filling scheme is advantageous because it reduces the number of times the first and second receiving vessels need to be connected and disconnected to the apparatus. Thus, the time required to fill two receiving vessels is reduced.

In the first filling scheme, when the first gas is transferred from the first bank to the first vessel, a portion of the first gas leaves the first bank. Consequently, the portion of the first gas remaining within the first bank expands within the first bank. This expansion occurs substantially isentropically which leads to the temperature of the first gas within the first bank decreasing. A portion of this cooled first gas flows into the second receiving vessel when the first gas from the first bank is transferred to a second receiving vessel. This cooling process is repeated when the second gas is transferred from the second bank of the plurality of banks. By transferring cooled gas into the second receiving vessel the temperature of gas in the second receiving vessel at the end of the fueling is reduced. This reduces the risk of damage caused by high temperatures in the second receiving vessel which is particularly advantageous in embodiments in which the receiving vessels are composite cylinders.

In accordance with another embodiment of the invention, the apparatus of FIG. 1 and the apparatus of FIG. 2 may be used in a second filling scheme to transfer gas into two receiving vessels in an alternative staggered manner to the first filling scheme. The apparatus may be used to first transfer a first gas from a first bank of the plurality of banks to a first receiving vessel and then transfer the first gas from the first bank to a second receiving vessel. Next, the apparatus may be used to first transfer a second gas from a second bank of the plurality of banks to the second receiving vessel and then transfer the second gas from the second bank to the first receiving vessel. These steps may be repeated for one or more further banks in the apparatus. Since the first and second gases are contained within one or more of the plurality of vessels in each bank, the first and second gases are the same type of gas.

The second filling scheme may be used as an alternative to the first filling scheme and provides similar advantages. However, in the second filling scheme both the first receiving vessel and the second receiving vessel receive cooled gas during the filling scheme. Thus, the second filling scheme reduces the risk of damage caused by high temperatures in the first receiving vessel.

The following examples illustrate the effects of different filling schemes when filling a series of receiving vessels.

Example 3

In this example an apparatus similar to the embodiments shown in FIG. 1 or 2 may be used to transfer gas to a series of receiving vessels. However, the apparatus of FIG. 1 or 2 is modified so that the plurality of vessels comprises nine vessels. Each vessel of the plurality of vessels comprises a composite material and has a volume of 1650 litres. The receiving vessels comprise fuel tanks in one or more buses, and each fuel tank comprises a composite material and has a volume of 1000 litres.

Initially, before any gas is transferred from the plurality of vessels to the series of receiving vessels, each of the plurality of vessels contain gas at a pressure of 450 bar and a temperature of 15° C. Each receiving vessel in the series of receiving vessels contains gas at a pressure of 80 bar and a temperature of 15° C.

The apparatus is in a nine stage configuration. That is, the plurality vessels are divided into nine banks where each bank comprises one vessel. In this example, the filling scheme comprises transferring gas into a receiving vessel from all nine banks before transferring gas to a subsequent receiving vessel.

Figure 5:
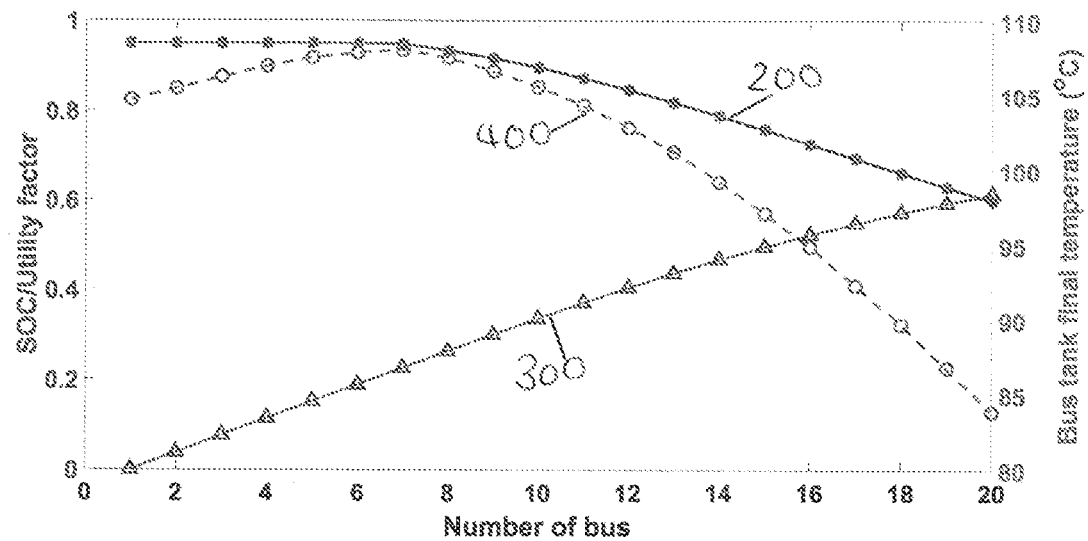
FIG. 5 shows graph of the fueling a series of receiving vessels using an exemplary filling scheme.

FIG. 5 shows the state of charge 200 of the receiving vessel at the end of each fill and the utility factor 300 (which is the same as the above-described cascade utilisation of the apparatus) at the end of each fill of a receiving vessel in the series and the temperature 400 in the receiving vessel at the end of the fill.

As shown in FIG. 5, this fill configuration is able to fill 19 receiving vessels to at least 60% state of charge. In this example, when the apparatus can only fill a receiving vessel to 60% state of charge, it may be considered that the plurality of vessels within the apparatus needs to be refilled. A total of 6 receiving vessels are charged to 95% state of charge. The utility factor after charging these receiving vessels is 22.6% and the average temperature of these six vessels is 106.5° C.

Example 4

The same procedure was conducted in Example 4 as Example 3 except the above-described first filling scheme was used. The first filling scheme is used to transfer gas from the nine banks into two receiving vessels in a stagger manner.

Figure 6:
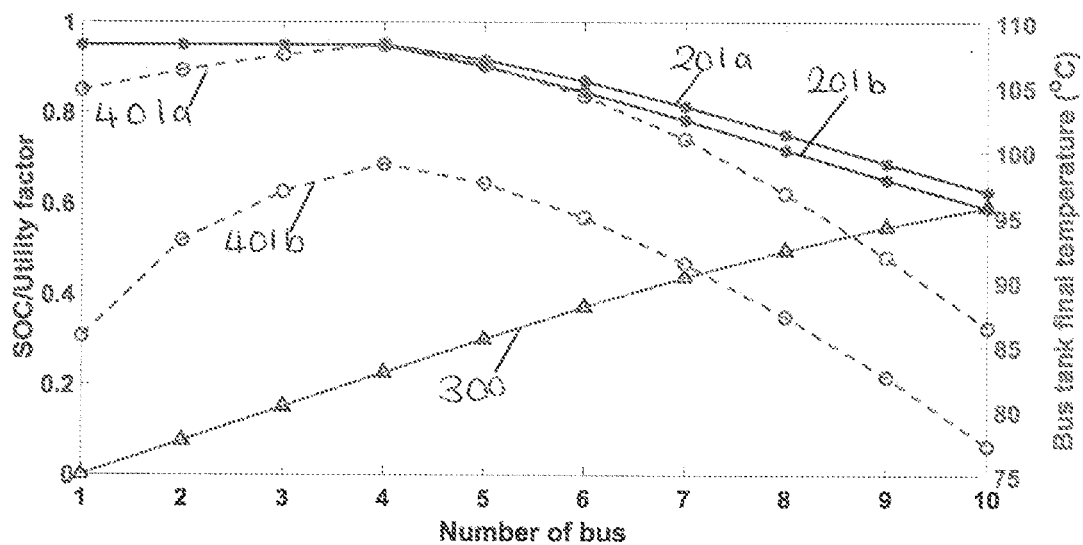
FIG. 6 shows graph of the fueling a series of receiving vessels using another exemplary filling scheme.

FIG. 6 shows the state of charge 201a, 201b of the receiving vessel at the end of each fill and the utility factor 301 (which is the same as the above-described cascade utilisation of the apparatus) at the end of each fill of a receiving vessel in the series and the temperature 401a, 401b in the receiving vessel at the end of the fill. In this case, total of 8 receiving vessel are filled to 95% state of charge and the system utility factor after filling these receiving vessels has increased to 30.2%. This improvement in utility factor is due to the above described cooling which occurs in the banks when using the first filling scheme.

The receiving vessels can be split into two series: series A 201a, 401a and series B 201b, 401b. Where series A includes the receiving vessel that initially receives the first gas and series B includes the receiving vessel that subsequently receives the first gas. In series A, the temperature begins at 104.7° C. and peaks at 108.2° C. for the 8 receiving vessels are filled to 95% state of charge whereas series B the temperature begins at 85.8° C. and peaks at 99° C. for the 8 receiving vessel are filled to 95% state of charge. The average receiving vessel temperatures for the vessels charged to 95% state of change is 106.7° C. for series A and 93.7° C. for series B. The series B temperature is therefore significantly lower than the temperatures reached in Example 3.

Example 5

The same procedure was conducted in Example 5 as Example 3 except the above-described second filling scheme was used. The second filling scheme is used to transfer gas from the nine banks into two receiving vessels in a stagger manner.

Figure 7:
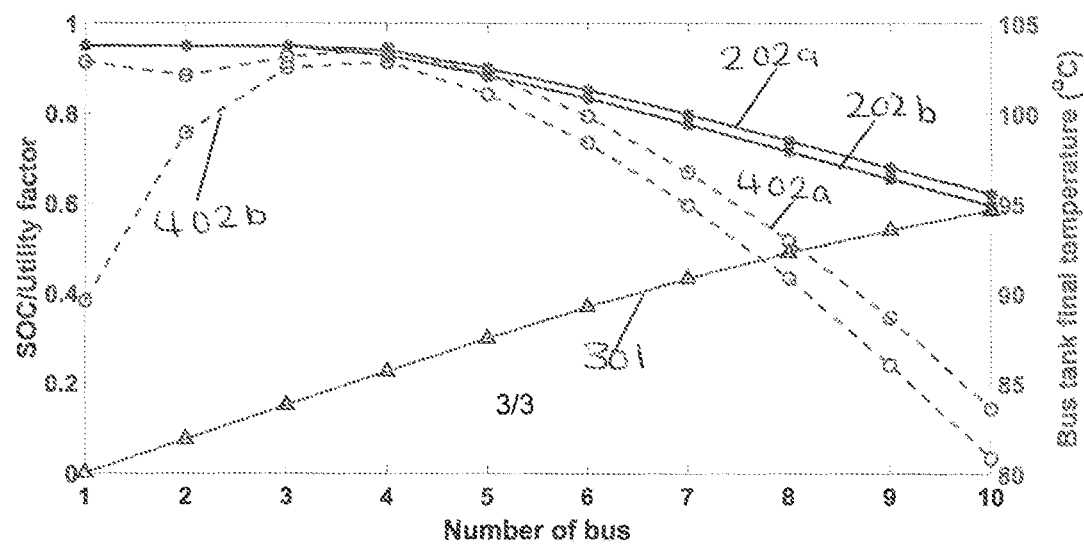
FIG. 7 shows graph of the fueling a series of receiving vessels using another exemplary filling scheme.

FIG. 7 shows the state of charge 202a, 202b of the receiving vessel at the end of each fill and the utility factor 302 (which is the same as the above-described cascade utilisation of the apparatus) at the end of each fill of a receiving vessel in the series and the temperature 402a, 403b in the receiving vessel at the end of the fill. The receiving vessels can be split into two series: series A 202a, 402a and series B 202b, 402b. Where series A includes the receiving vessel that initially receive the first gas and series B includes the receiving vessel that subsequently receives the first gas.

In this case, total of 6 buses are filled to 95% state of charge. The reason for a poorer performance in Example 4 can be explained as when a series B receiving vessel is initially filled with the first bank in the apparatus, it is then immediately topped up by a second bank. This results in the more gas being drained from the second bank than when the first filling scheme is used. This will deteriorate the utility factor of the apparatus. However, in the second filling scheme receiving vessels in both series A and B receive cooled gas. This is evident from FIG. 5 where the average series A and B temperatures for receiving vessels are charged to 95% are 102.7° C. and 97.0° C., respectively. Thus, using the second filling scheme the series A and B temperatures are therefore significantly lower than the temperatures reached in Example 3.

Various modifications to the above-described embodiments will be apparent to the skilled person.

In certain embodiments, each apparatus shown in FIG. 1 or FIG. 2 may comprise a mobile fueling apparatus. Providing a mobile fueling apparatus enables the apparatus to be transported between the place of use and the location where the plurality of vessels are filled with gas. In such embodiments, the apparatus may be housed within a container suitable for transportation by a vehicle such as a truck or lorry. The apparatus may be housed within the container such that the plurality of vessels are substantially within the container and the hose or hoses extending from the container for attachment to one or more receiving vessels. Prior to transporting the mobile fueling apparatus, the manual valves in the apparatus may be close to reduce the risk of gas flowing from the plurality of vessels to the manifold during transport. In such embodiments, the plurality of vessels preferably comprises composite cylinders to reduce the weight of the apparatus for transportation. In certain embodiments, the apparatus may be partially mobile. That is, only a part of the apparatus is mobile, for example, the plurality of vessels may be mobile whereas the manifold, control valves and restrictions may not be mobile.

The fluid paths between the plurality of vessels and the at least one receiving vessel are not limited to the arrangements shown in FIGS. 1 and 2. The apparatus may comprise an alternative arrangement of fluid paths to selectively fluidly connect a plurality of vessels to a receiving vessel. The apparatus may comprise alternative means to control the flow of fluid along the fluid paths. For example, the apparatus of FIG. 2 may be modified so that the first, second, third, fourth and fifth fluid paths each divide into two branches after the first and second restrictions. Each branch of the fluid paths may then comprise a control valve. One branch from each of the fluid paths may converge at a first common manifold which is fluidly connectable to a first receiving vessel and the other branch from each of the fluid paths may converge at a second common manifold which is fluidly connectable to a second receiving vessel. Such an arrangement may be used to fill the first receiving vessel from a first bank and simultaneously fill the second receiving vessel from a second bank. The bank-to-receiving vessel allocation may then be subsequently swapped so that the first bank is used to fill the second receiving vessel and the second bank is used to fill the first receiving vessel. Any suitable arrangement may be used to enable fluid to selectively flow from a plurality of vessels into a receiving vessel.

In certain embodiments, the plurality of vessels may not be the same size or made of the same materials as one other. The plurality of vessels may comprise vessels having different sizes provided the first and second restrictions on the fluid paths connected to each vessel are sized to suit the entry and exit gas flow rates of that vessel.

In the above-described embodiments, the first and second restrictions are provided in a modified non-return valve on each fluid path. However, the fluid paths and the first and second restrictions may be provided by any means suitable for limiting the gas flow rate into and out of the vessels, respectively.

In one alternative to the above-described embodiments, the first fluid path may comprise a first branch for allowing gas to flow from the first vessel and a second branch for allowing gas to flow into the first vessel. The first branch may comprise the first restriction and a first non-return valve configured to allow gas to flow from the first vessel. The second branch may comprise the second restriction and a second non-return valve configured to allow gas to flow from the first vessel. The first restriction may comprise a fixed orifice positioned along the first fluid path. The area of the orifice may be selected to limit the maximum flowrate of gas along the first flow path from the first vessel. Providing the first restriction as a fixed orifice is advantageous because it is low cost and reliable. However, the first and second restrictions may be provided by alternative means. The first and second restrictions may comprise any suitable means for limiting a gas flow rate to a desired pressure ramp rate. Examples of suitable means include a venturi nozzle, excess flow valve or a needle valve. Alternatively, control system methods could also be used to control the gas flow rate. Such systems may comprise measuring the flowrate using a mass flow meter or measuring a pressure ramp rate using the pressure transmitter coupled via a control system to a mass flow controller, on/off valve, or variable area valve to restrict the flow as appropriate.

In the embodiments of FIGS. 1 and 2, the apparatus comprises one first restriction and one second restriction for each vessel in the plurality of vessel. In alternative embodiments, the fluid paths in the apparatus may be arranged so two or more vessels share the same first restriction and the same second restriction.

Whilst the control valves on the fluid paths of embodiments shown in FIGS. 1 and 2 are on/off two-way valves, the skilled person will appreciate that different valves may be used to control the flow of gas. For example, the control valves may comprise three-way valves to select the flow of gas through the apparatus.

In certain embodiment, the apparatus may be configured to be connected to three or more receiving vessels at the same time. Thus, the apparatus may comprise three or more hoses, output control valves, output restrictions and output pressure transmitters.

In the above-described use of the apparatus, the plurality of vessels in the apparatus initially contain gas at substantially the same pressure as one other. However, the plurality of vessels may contain gas at different pressures before a receiving vessel is filled. In such instances, the control means may be used to determine the pressure in each of the plurality of banks and order the plurality of banks by pressure and before sequentially fluidly connecting the plurality of banks to the receiving vessel. In this way, the plurality of banks are connected to the receiving vessel in order of increasing pressure.

Throughout the specification, "substantially the same" when referring to two or more vessels being at substantially the same pressure may be understood to mean that there is a 10% or less, a 5% or less, or a 2% or less difference in the pressure of the vessels. For example, two vessels may be considered to have substantially the same pressure when the two 35 pressures of the vessels measured in Barg are between 0 and 10%, 0 and 5%, or 0 and 2% of each other. This pressure range may help to optimize the speed at which gas is transferred to the receiving vessels versus achieving as high a pressure in the receiving vessel as possible.

Whilst the above examples relate to embodiments including a first receiving vessel and a second receiving vessel, in other embodiments, any suitable number of receiving vessels may be used. In such embodiments, the order of filling of the receiving vessels may be in any order, where the order may be sequential (e.g. first, second, third, first second, third, etc.) or it may be non-sequential (e.g. when two or more receiving vessels are simultaneously filled, or when receiving vessels are filled one at a time but in a non-sequential filling order).

An advantage associated with the ability to select the number of banks and the number or vessels in each bank, is the capability of being able to revert to a single bank that includes all of the vessels for the refilling of the vessels. In such an arrangement, the re-filling process is analogous to the straight-forward task of filling a large, single vessel.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. An apparatus for fuelling comprising:
  a plurality of vessels for containing a fuel gas, each vessel of the plurality of vessels being selectively fluidly connectable to at least one receiving vessel;
  a control means configured to selectively divide the plurality of vessels into a plurality of banks by selecting between allocating one vessel of the plurality of vessels and more than one vessel of the plurality of vessels in each of the plurality of banks;
  at least one first restriction arranged to provide a first gas flow rate for gas exiting the plurality of vessels and at least one second restriction arranged to provide a second gas flow rate for gas entering the plurality of vessels;
  wherein the control means is further configured to sequentially fluidly connect the plurality of banks to the at least one receiving vessel such that when one of the plurality of banks is fluidly connected to the at least one receiving vessel the one or more of the plurality of vessels within that bank are fluidly connected to the at least one receiving vessel but are fluidly isolated from the one or more of the plurality of vessels of the remaining ones of the plurality of banks; and wherein the second gas flow rate is different to the first gas flow rate.

2. An apparatus for fuelling according to claim 1, wherein the control means is configured to sequentially fluidly connect the plurality of banks to the receiving vessel in order of increasing pressure of the plurality of banks.

3. An apparatus for fuelling according to claim 1, comprising a manifold, wherein each vessel of the plurality of vessels is selectively fluidly connectable to the manifold and the manifold is selectively fluidly connectable to the at least one receiving vessel.

4. An apparatus for fuelling according to claim 3, wherein the control means is configured to substantially equilibrate the pressure in the one or more of the plurality of vessels within each of the plurality of banks before transferring gas from the plurality of banks to the at least one receiving vessel.

5. An apparatus for fuelling according to claim 1, wherein the first gas flow rate is greater than the second gas flow rate.

6. An apparatus for fuelling according to claim 5, wherein the at least one first restriction is provided by a non-return valve and the at least one second restriction comprises a conduit arranged to provide a fluid path which bypasses the non-return valve.

7. An apparatus for fuelling according to claim 6, wherein the conduit extends through the non-return valve.

8. An apparatus for fuelling according to claim 6, wherein the non-return valve comprises a bore configured to provide the first gas flow rate.

9. An apparatus for fuelling according to claim 1, wherein the at least one first restriction comprises a first restriction for each of the plurality of vessels and the at least one second restriction comprises a second restriction for each of the plurality of vessels.

10. An apparatus for fuelling according to claim 1, wherein the first and second restrictions comprise fixed orifices.

11. An apparatus for fuelling according to claim 1, wherein the at least one receiving vessel comprises a plurality of receiving vessels.

12. An apparatus for fuelling according to claim 1, wherein the fuel gas comprises hydrogen.

13. An apparatus for fuelling according to claim 1, wherein each of the plurality of vessels comprises a composite cylinder.

14. An apparatus for fuelling according to claim 1, wherein the fuelling apparatus is a mobile fuelling apparatus.

15. A method of use of an apparatus according to claim 1, the method comprising:
transferring a first gas from a first bank of the plurality of banks to a first receiving vessel;
transferring the first gas from the first bank to a second receiving vessel;
transferring a second gas from a second bank of the plurality of banks to the first receiving vessel; and
transferring the second gas from the second bank to the second receiving vessel;
wherein the first gas is the same type as the second gas.

16. A method of use of an apparatus according to claim 1, the method comprising:
transferring a first gas from a first bank of the plurality of banks to a first receiving vessel;
transferring the first gas from the first bank to a second receiving vessel;
transferring a second gas from a second bank of the plurality of banks to the second receiving vessel; and
transferring the second gas from the second bank to the first receiving vessel;
wherein the first gas is the same type as the second gas.

* * * * *